(12) United States Patent
Chen et al.

(10) Patent No.: US 8,285,765 B2
(45) Date of Patent: Oct. 9, 2012

(54) SYSTEM AND METHOD FOR IMPLEMENTING SIMPLIFIED ARITHMETIC LOGIC UNIT PROCESSING OF VALUE-BASED CONTROL DEPENDENCE SEQUENCES

(75) Inventors: Lei Chen, Austin, TX (US); Hung C. Ngo, Austin, TX (US); Kevin J. Nowka, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 11/608,907

(22) Filed: Dec. 11, 2006

(65) Prior Publication Data

US 2008/0141006 A1 Jun. 12, 2008

(51) Int. Cl.
*G06F 7/38* (2006.01)
(52) U.S. Cl. ........................................................ 708/207
(58) Field of Classification Search ........... 708/200–209
See application file for complete search history.

(56) References Cited

U.S. PATENT DOCUMENTS

| | | | | |
|---|---|---|---|---|
| 4,774,688 A | * | 9/1988 | Kobayashi et al. | 708/207 |
| 5,051,939 A | * | 9/1991 | Nakamura | 708/207 |
| 5,726,923 A | * | 3/1998 | Okumura et al. | 708/207 |
| 5,991,785 A | * | 11/1999 | Alidina et al. | 708/207 |
| 6,272,188 B1 | * | 8/2001 | Mobin et al. | 375/341 |
| 6,848,074 B2 | * | 1/2005 | Coombs | 714/795 |
| 7,552,155 B2 | * | 6/2009 | Huggett | 708/207 |
| 7,725,513 B2 | * | 5/2010 | Zabarski et al. | 708/207 |
| 2002/0188639 A1 | * | 12/2002 | Catherwood | 708/200 |
| 2004/0148320 A1 | * | 7/2004 | Zabarski et al. | 708/207 |
| 2007/0118580 A1 | * | 5/2007 | Huggett | 708/207 |

OTHER PUBLICATIONS

"ADSP-21160 SHARC® DSP Instruction Set Reference, Revision 2.0", Nov. 2003, Analog Devices, Inc., pp. 7-26.
"Intel Architecture Software Developer's Manual; vol. 2: Instruction Set Reference", 1999, Intel Corporation, pp. 3-72-3-77; 3-402-3-406.
Frey, B., May, C., Silha, E., Wetzel, J., "PowerPC User Instruction Set Architecture, Book I, Version 2.01", Sep. 2003, IBM Corporation, pp. 23, 58, 64.

* cited by examiner

*Primary Examiner* — David H Malzahn
(74) *Attorney, Agent, or Firm* — Yudell Isidore Ng Russell PLLC

(57) ABSTRACT

A system and method for implementing arithmetic logic unit (ALU) support for value-based control dependence sequences. According to a first embodiment of the present invention, an ALU generates a carry-out signal designating one of a first and second value as a larger value. In response to the carry-out signal, the ALU updates a storage location with a third value, which is the larger value. According to a second embodiment of the present invention, an ALU generates a carry-out signal designating one of a first and second value as a larger value. In response to the carry-out signal, the ALU updates a storage location with a third value. The third value is a fourth value, if the carry-out signal designates the first value as the larger value or the third value is a fifth value, if the carry-out signal designates the second value as the larger value.

8 Claims, 4 Drawing Sheets

SYSTEM AND METHOD FOR IMPLEMENTING SIMPLIFIED ARITHMETIC LOGIC UNIT PROCESSING OF VALUE-BASED CONTROL DEPENDENCE SEQUENCES

BACKGROUND OF THE INVENTION

1. Technical Field

The present invention relates in general to the field of data processing systems. More particularly, the present invention relates to improving processing of instruction sequences including instructions that conditionally change program flow.

2. Description of the Related Art

A state-of-the-art superscalar processor can include, for example, an instruction cache for storing instructions, an instruction buffer for temporarily storing instructions fetched from the instruction cache for execution, one or more execution units for executing instructions, a branch processing unit (BPU) for executing branch instructions, a dispatch unit for dispatching instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential execution path to a specified target execution path and do not depend on a condition supplied by the occurrence of an event. Thus, the branch specified by an unconditional branch instruction is always taken. In contrast, conditional branch instructions are branch instructions for which the indicated branch in program flow may be taken or not taken depending upon a condition within a processor, for example, the state of specified condition register bits or the value of a counter. Conditional branch instructions can be further classified as either resolved or unresolved based upon whether or not the conditional branch instruction is evaluated by the branch processing unit (BPU).

Because the condition upon which a resolved conditional branch instruction depends is known prior to execution, resolved conditional branch instructions can typically be executed and instructions within the target execution path are fetched with little or no delay in the execution of sequential instructions. Thus, it is advantageous to determine condition register bits or another condition upon which a conditional branch instruction may depend as quickly as possible so that the conditional branch instruction can be resolved prior to execution. Even if a conditional branch instruction is not resolved prior to its execution, meaning that the conditional branch is speculatively predicted, it is still advantageous to compute the condition upon which the branch instruction depends as quickly as possible because the performance penalty incurred in the event of misprediction is thereby minimized.

One challenge in accurately predicting conditional branches involves "value-based control dependence" sequences in which the program flow is determined based upon a comparison of the values of two or more program variables. Because the variable values may change in a fashion that is difficult to determine a priori, value-based conditional branches are consequently difficult to accurately predict. Because modern processors include a large number of execution units having deeper pipeline stages, an incorrect prediction of a value-based conditional branch in a value-based conditional dependence sequence results in a large performance penalty.

Therefore, there is a need for a system and method for efficiently processing value-based control sequences to overcome the limitations of the prior art.

SUMMARY OF THE INVENTION

The present invention includes a system and method for implementing arithmetic logic unit (ALU) support for value-based control dependence sequences. The present invention enables a processor to process value-based control dependence sequences without the use of a branch prediction unit, as implemented in the prior art.

According to a first embodiment of the present invention, an ALU generates a carry-out signal designating one of a first and second value as a larger value. In response to the carry-out signal, the ALU updates a storage location with a third value, which is the larger value.

According to a second embodiment of the present invention, an ALU generates a carry-out signal designating one of a first and second value as a larger value. In response to the carry-out signal, the ALU updates a storage location with a third value. The third value is a fourth value, if the carry-out signal designates the first value as the larger value or the third value is a fifth value, if the carry-out signal designates the second value as the larger value.

The above, as well as additional purposes, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1:
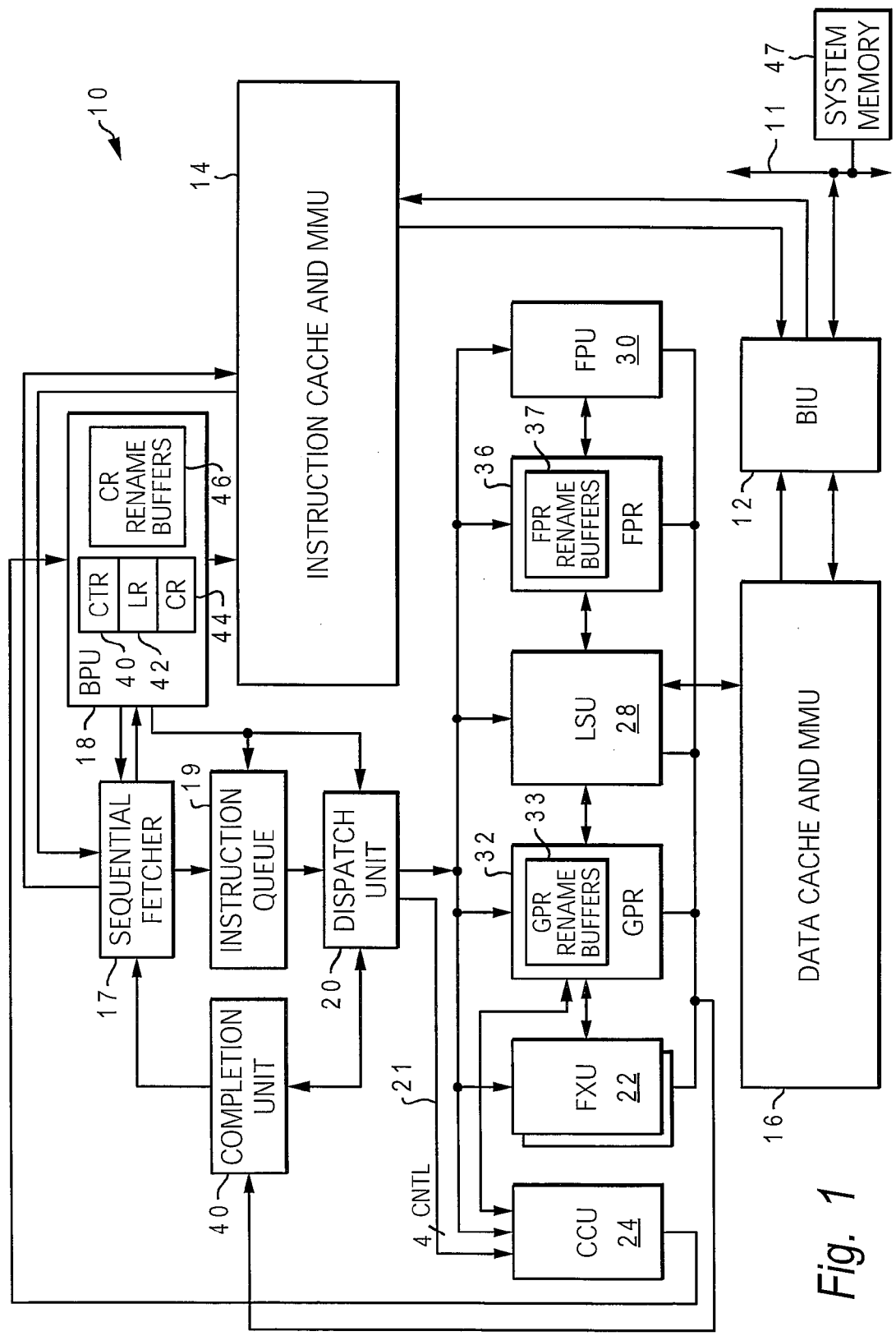
FIG. 1 depicts an illustrative embodiment of a data processing system with which the method and system of the present invention may be advantageously utilized.

With reference now to the figures and in particular with reference to FIG. 1, there is depicted a block diagram of an illustrative embodiment of a processor, indicated generally at 10, for processing information in accordance with the invention recited in the appended claims. In the depicted illustrative embodiment, processor 10 comprises a single integrated circuit superscalar microprocessor. Accordingly, as discussed further below, processor 10 includes various execution units, registers, buffers, memories, caches and other functional units, which are all formed by integrated circuitry. Processor 10 preferably comprises one of the POWER™ line of microprocessors available from IBM Microelectronics; however, those skilled in the art will appreciate from the following description that the present invention can advantageously be implemented within other suitable processors.

As illustrated in FIG. 1, processor 10 is coupled to bus 11 via a bus interface unit (BIU) 12 within processor 10. BIU 12 controls the transfer of information between processor 10 and other devices coupled to bus 11, such as a system memory 47, which together with processor 10 and bus 11 form a fully functional data processing system. BIU 12 is also connected to instruction cache 14 and data cache 16 within processor 10. High-speed caches, such as instruction cache 14 and data cache 16, enable processor 10 to achieve relatively fast access times to a subset of data or instructions previously transferred from main memory to caches 14 and 16, thus improving the overall performance of the data processing system. Instruction cache 14 is further connected to sequential fetcher 17, which fetches up to a cache line of instructions from instruction cache 14 during each cycle and transmits the fetched instructions to both branch processing unit (BPU) 18 and instruction queue 19. Branch instructions are retained by BPU 18 for execution and are cancelled from instruction queue 19; sequential instructions, on the other hand, are cancelled from BPU 18 and buffered within instruction queue 19 for subsequent execution by sequential instruction execution circuitry within processor 10.

BPU 18 includes count register (CTR) 40, link register (LR) 42, and condition register (CR) 44, the value of which may be utilized to resolve conditional branch instructions. BPU 18 further includes CR rename buffers 46, which temporarily store renamed copies of CR 44 generated by the execution of compare instructions or generated in parallel with the execution of certain instructions. In a preferred embodiment, CR 44 (and each of CR rename buffers 46) contains a number of distinct fields that each comprises one or more bits. Among these fields is a condition code field containing LT, GT, and EQ bits, which respectively indicate if a value (typically the result of an instruction) is less than zero, greater than zero, or equal to zero. Conditional branch instructions that cannot be resolved prior to execution by reference to CR 44, LR 42, or CTR 40 are preferably predicted utilizing conventional branch processing circuitry within BPU 18 such as a branch history table (BHT) or branch target address cache (BTAC).

In the depicted illustrative embodiment, in addition to BPU 18, the execution circuitry of processor 10 comprises multiple execution units for sequential instructions, including one or more fixed-point units (FXUs) 22, one or more load-store units (LSU) 28, and one or more floating-point units (FPU) 30. As is well-known to those skilled in the computer arts, each of execution units 22, 28, and 30 typically executes one or more instructions of a particular type of sequential instructions during each processor cycle. For example, FXU(s) 22 perform fixed-point mathematical and logical operations such as addition, subtraction, AND, OR, and XOR, utilizing source operands received from specified general purpose registers (GPRs) 32 or GPR rename buffers 33. Following the execution of fixed-point instruction, FXU 22 outputs the data results of the instruction to GPR rename buffers 33, which provide temporary storage for the result data until the result data is written from GPR rename buffers 33 to one or more GPRs 32. FPU 30 typically performs single and double-precision floating-point arithmetic operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the result data is written from FPR rename buffers 37 to selected FPRs 36. As its name implies, LSU 28 typically executes floating-point and fixed-point instructions, which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

In addition to execution units 22, 28, and 30, the execution circuitry of processor 10 includes condition code unit (CCU) 24, which directly executes signed and unsigned compare instructions and computes condition bits for recording instructions processed by other execution units. As illustrated, CCU 24 receives four control signals 21 from dispatch unit 20 that indicate the instruction type of each compare and recording instruction dispatched. CCU 24 also receives from GPRs 32 and/or GPR rename buffers 33 (and possibly other sources) the operands specified by each compare and recording instruction.

Processor 10 may employ both pipelining and out-of-order execution of instructions to further improve the performance of its superscalar architecture. Accordingly, instructions can be executed opportunistically by FXU 22, CCU 24, LSU 28, and FPU 30 in any order as long as data dependencies and antidependencies are observed. In addition, as is typical of many high-performance processors, each instruction is processed at a number of pipeline stages, including fetch, decode/dispatch, execute, finish, and completion/writeback.

During the fetch stage, sequential fetcher 17 retrieves up to a cache line of instructions from instruction cache 14. As noted above, sequential instructions fetched from instruction cache 14 are buffered within instruction queue 19, which branch instructions are removed (folded out) from the sequential instruction stream. Branch instructions are processed at each of the remaining pipeline stages by circuitry within BPU 18.

During the decode/dispatch stage, dispatch unit 20 decodes and dispatches one or more sequential instructions from instruction queue 19 to execution units 22, 24, 28, and 30. During the decode/dispatch stage, dispatch unit 20 also allocates a rename buffer within GPR rename buffers 33 or FPR rename buffers 37 for each dispatched instruction's result data, if necessary. In the depicted illustrative embodiment, instructions dispatched by dispatch unit 20 are also passed to a completion buffer with completion unit 40. Processor 10 tracks the program order of the dispatched instructions during out-of-order execution utilizing unique instruction identifiers associated with the instructions in the completion buffer of completion unit 40.

During the execute stage, execution units 22, 24, 28, and 30 execute sequential instructions received from dispatch unit 20 opportunistically as operands and execution resources for the indicated operations become available. Each of execution units 22, 24, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. CCU 24, on the other hand, stores the condition code bits it generates within the condition code field of one of CR rename buffers 46.

Next, execution units 22, 24, 28, and 30 notify completion unit 40 which instructions stored within the completion buffer of completion unit 40 have finished execution. Instructions are then completed by completion unit 40 in program order by marking the instructions as complete in the completion buffer. Thereafter, during the writeback stage, which is preferably merged with the completion stage, the results of the instructions are transferred from the CR rename buffer 46 to CR 44 and from GPR rename buffers 33 and FPR rename buffers 37 to GPRs 32 and FPRs 36, respectively.

Figure 2:
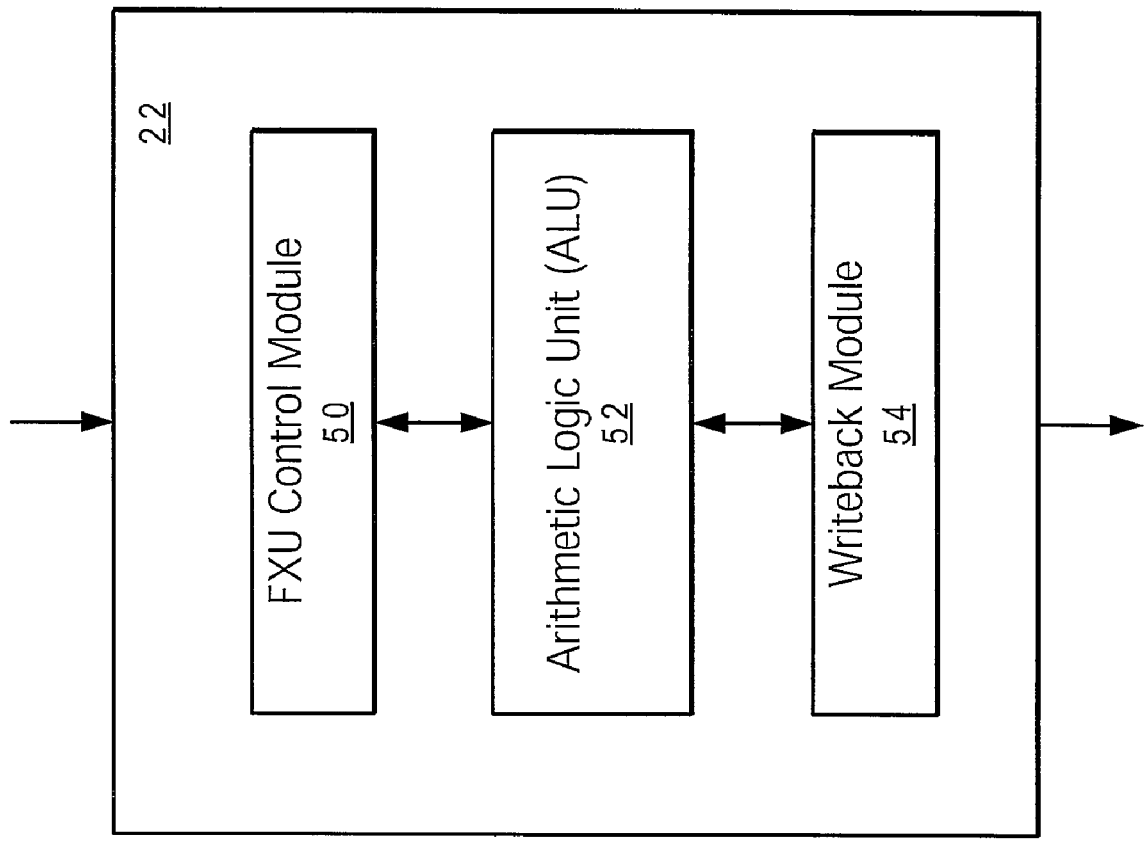
FIG. 2 is a block diagram of a fixed-point unit as illustrated in FIG. 1.

FIG. 2 is a more detailed block diagram floating-point unit (FXU) 22 as depicted in FIG. 1. As illustrated, FXU 22 includes an FXU control module 50, arithmetic logic unit (ALU) 52, and writeback module 54. According to a preferred embodiment of the present invention, FXU control module 50 performs the final decode of instructions received from dispatch unit 20 and retrieves the necessary operands from GPRs 32 to perform the functions dictated by the instructions. The operands and decoded instruction signals are sent to ALU 52, which performs the processing of the instructions and sends the results to writeback module 54. Writeback module 54 writes the results of the processed instructions back to GPRs 32.

As previously discussed, the accuracy of branch prediction tends to be lower when the branch decisions are value-based. A pseudo-code example of a value-based control dependence sequence conventionally coded utilizing a value-based conditional branch instruction is as follows:

```
If x > y, then z = x
else z = y
```

The first section of the pseudo-code (if x>y) compares two values, x and y. If x is greater than y, z takes the value of x (then z=x). Otherwise, z takes the value of y (else z=y).

Value-based control dependence sequences such as that set forth above are handled in a variety of ways in different computer architectures. The Power5 microprocessor, a product of IBM Corporation, implements the above value-based control dependence sequence with the following sequence of four instructions:

```
1000  mr   <*move a first value x to a register*>
1002  cmp  <*compare the first value x with a second value y*>
1004  bge  <*if x >= y, branch to address 1008, if x < y
            continue at address 1006*>
1006  mr   <*move the second value y to the register*>
1008  <*further instructions*>
```

The Opteron® processor, a product of Advanced Micro Devices (AMD) Corporation, implements the above value-based control dependence sequences with the following sequence of three instructions:

```
1000  mov   <*move a first value x to a register*>
1002  cmp   <*compare the first value x with a second value y*>
1004  cmov  <*a conditional move of a second value y to
             the register if x > y*>
1006  <*further instructions*>
```

According to a preferred embodiment of the present invention, value-based control dependence sequences can be implemented by a single MAX instruction if only two values are considered, as shown in the following code sequence:

```
1000  <*receive A and B*>
1002  MAX Z,A,B
1004  <* further instructions *>
1006  <*further instructions *>
```

Figure 3A:
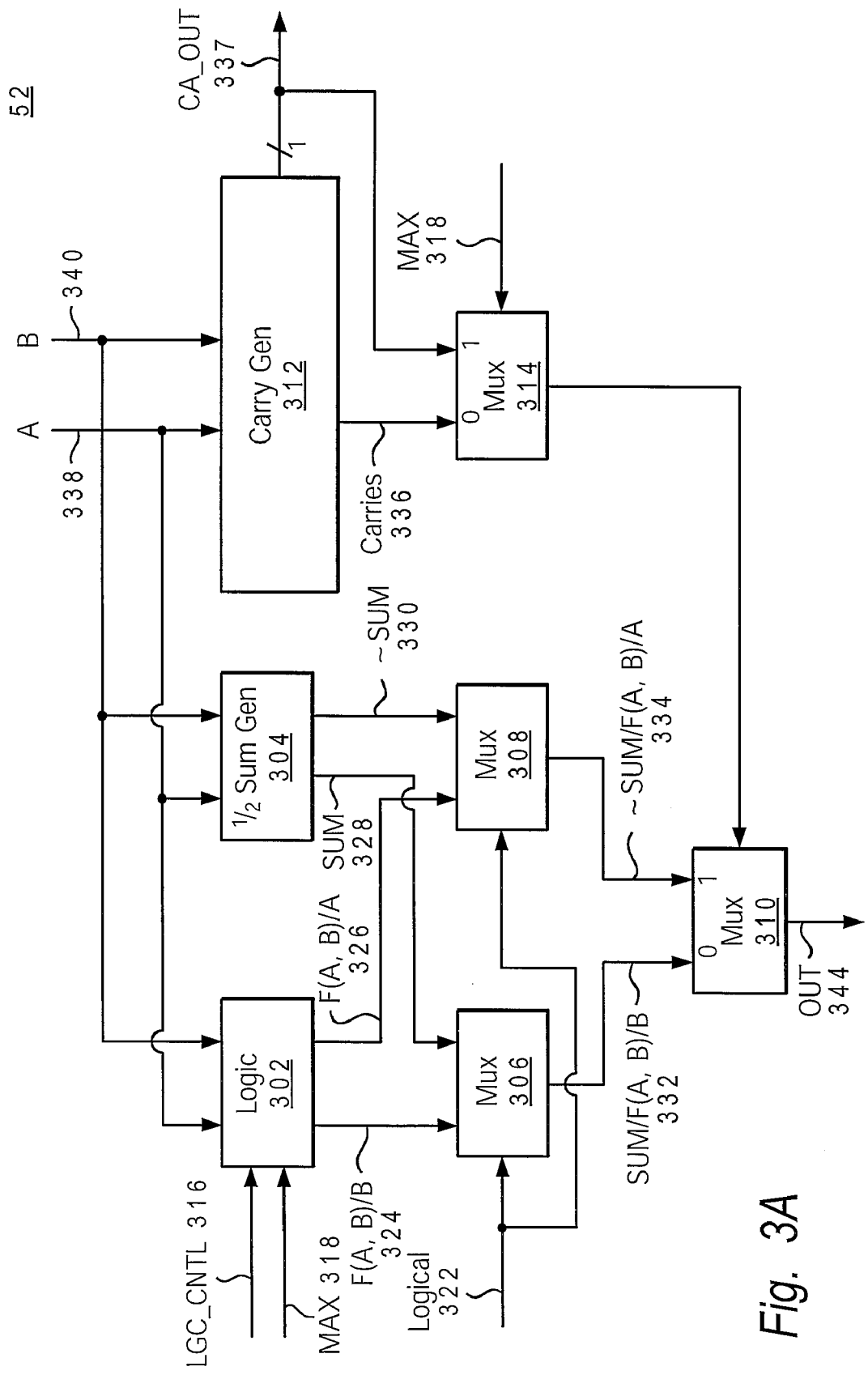
FIG. 3A is a block diagram of a first embodiment of an exemplary arithmetic logic unit (ALU) in accordance with the present invention.

FIG. 3A is a block diagram illustrating an exemplary arithmetic logic unit (ALU) 52 as depicted in FIG. 2, which supports evaluation of a value-based control dependence sequence through execution of a single MAX instruction in accordance with a first embodiment of the present invention. As depicted, ALU 52 includes multiple control signals (LGC_CNTL 316, MAX 318, and Logical 322) that are asserted or deasserted by FXU control module 50 in response to decoding an instruction received from dispatch unit 20.

Input A 338 and Input B 340, which receive an operand A and an operand B, respectively, are coupled to carry generator 312, logic block 302, and sum generator 304. Carry generator 312 outputs two signals that are coupled to mux 314, carries 336 and CA_OUT 337. Logic block 302 outputs a result of a logical operation performed on operands A and B via signal line 324 leading to mux 306 and signal line 326 leading to mux 308. Muxes 306 and 308 are coupled to signal lines 332 and 334, respectively, which select between a logical result and an arithmetic result, depending on the control signals asserted by FXU control module 50. Both signal lines 332 and 334 are coupled to mux 310, which is further coupled to OUT 344.

ALU 52 operates differently depending on the assertion and deassertion of LGC_CNTL 316, MAX 318, and Logical 322 signals by FXU control module 50 according to Table 1.

TABLE 1

| | Logical Instruction | Arithmetic Instruction | MAX Instruction |
|---|---|---|---|
| LGC_CNTL | asserted | deasserted | deasserted |
| MAX | deasserted | deasserted | asserted |
| Logical | asserted | deasserted | asserted |

For logical operations (e.g., AND, OR, NOR, etc.), FXU control module 50 asserts both the LGC_CNTL 316 and Logical 322 signals. LGC_CNTL 316 indicates the specific logical function F (e.g., AND, OR, XOR, etc.) to be performed on operands A and B. The result of the logical function F(A,B) is passed via signal lines 324 and 326 to muxes 306 and 308. The assertion of logical signal 322 by FXU control module 50 enables the result F(A,B) to pass through muxes 306 and 308 to OUT 344, which is controlled by carries 336.

For arithmetic instructions (e.g., ADD, SUBTRACT, etc.), sum generator 304 performs the specified arithmetic operation on operands A and B, and carry generator 312 generates a carry out value via carries signal 312. Logical signal 322 and LGC_CNTL signal 316 are deasserted by FXU control module 50, which enables two signals SUM 328 (leading to mux 306) and its inverse ~SUM 330 (leading to mux 308) to OUT 344.

For execution of a MAX instruction, LGC_CNTL signal 316 is deasserted and Logical signal 322 is asserted to enable the values received at Input A 338 and Input B 340 to pass through logic unit 302. MAX signal 318 is asserted. Carry generator 312 outputs CA_OUT 337, which indicates which of operands A or B is greater. Preferably, carry generator 312 performs a subtraction function by inverting B and adding 1. As well-known in the art, a subtract function is performed by adding a negative number, which is represented by the complement plus one. When a MAX instruction is executed, only the carry-out bit (the highest order bit of the 64 carry bits for a 64-bit ALU), represented by CA_OUT 337, is utilized to imply whether A or B is the larger value. In the exemplary value-based control dependence instruction given above, ALU 52 receives the values A and B at Input A 338 and Input B 340, respectively, and MAX signal 318 is asserted. If CA_OUT signal 337 indicates that A is greater than B, OUT signal 344 outputs the value of A. Otherwise, OUT signal 344 outputs the value of B.

TABLE 2

| ALU FUNCTION | OUT SIGNAL |
| --- | --- |
| Logical (specific function F(A,B) specified by LGC_CNTL) | F(A,B) |
| MAX(A,B) | A or B (CA_OUT dependent) |
| SUM (Logical deasserted) | SUM(A,B) or ~SUM(A,B) (Carries dependent) |

According to a second embodiment of the present invention, value-based control dependence sequences can be handled by a two processor cycle instruction with a single structural modification to ALU 52. The second embodiment enables ALU 52 to make a determination between a second pair of values, depending on the results of a comparison between a first pair of values, as shown in the following code sequence:

```
1000  <*receive A and B*>
1002  MAX A,B
1004  CMOV Z,X,Y
```

Figure 3B:
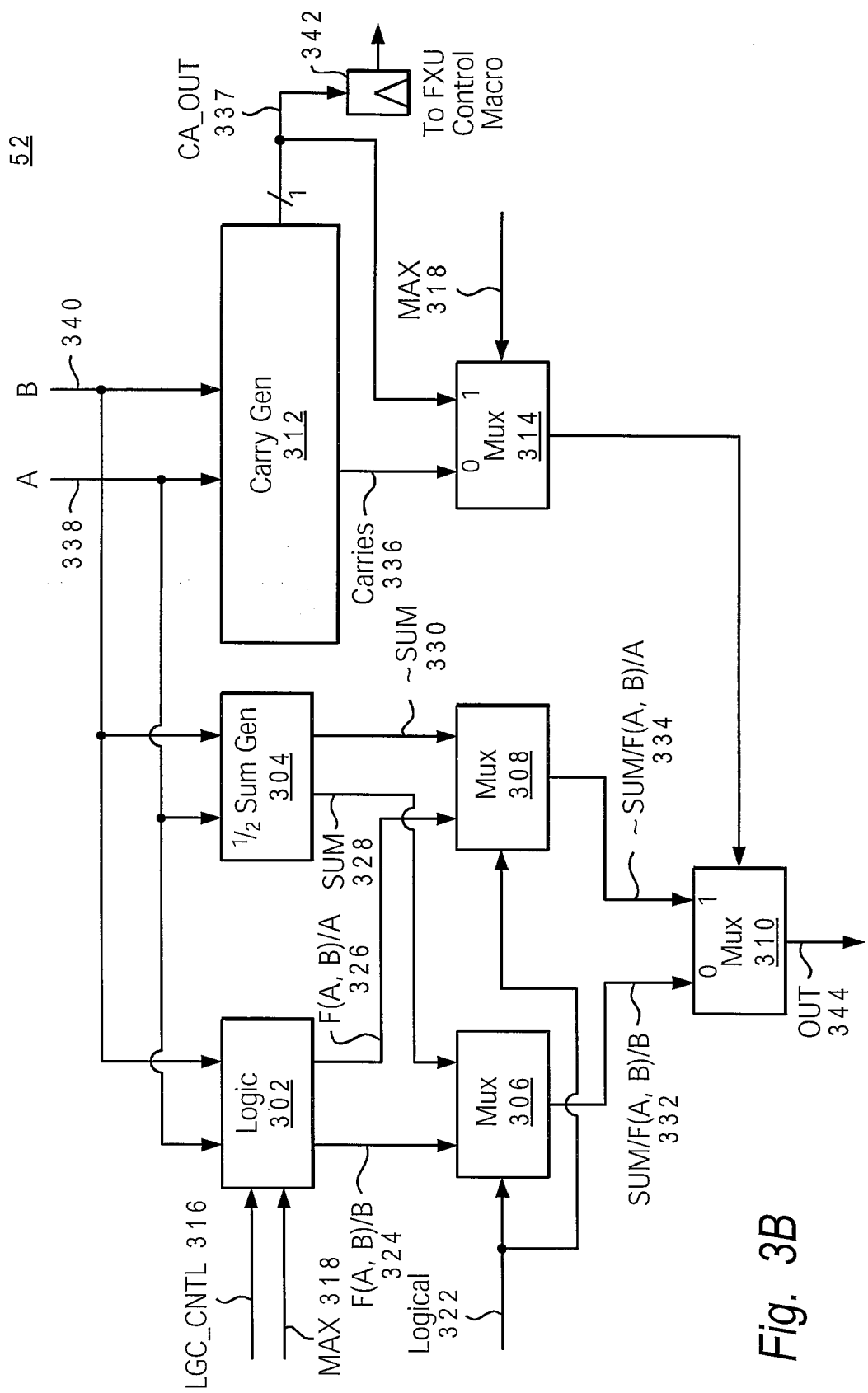
FIG. 3B is a block diagram of a second embodiment of an exemplary ALU in accordance with the present invention.

FIG. 3B is a block diagram illustrating an exemplary arithmetic logic unit (ALU) 52 as depicted in FIG. 2, according to a second embodiment of the present invention. FIG. 3B illustrates a two-cycle ALU 52, which solves the following value-based control dependence sequence: If A>B, then Z=X; else Z=Y. As depicted in FIG. 3B, ALU 52 includes a latch 342 for storing the results of a first comparison between A and B during a first cycle. The results of the first comparison during the first cycle are forwarded back to FXU control module 50 to dictate the result of the control flow determination made in the second cycle.

For example, in the first cycle, a comparison is made by ALU 52 of the A and B operands presented at Input A 338 and Input B 340. The result of the comparison is buffered in latch 342, which instructs fixed point unit 222 to make an appropriate selection in the second cycle, when operands X and Y (which may be different from or the same as A and B) are presented at Input A 338 and Input B 340.

Those with skill in the art will appreciate that the present invention may also include a MIN function. In the first embodiment, carry generator 312 determines whether A or B provided by Input A 338 and Input B 340 is the smaller value. In response to the determination, a storage location Z is updated with A, if A is smaller than B. If B is smaller than A, the storage location Z is updated with B.

In the second embodiment, carry generator 312 determines whether A or B is the smaller value. In the next processor cycle, X and Y are presented at Input A 338 and Input B 340. If A is the smaller value, a storage location Z is updated with X. If B is the smaller value, the storage location Z is updated with B.

As discussed, the present invention includes a system and method for implementing arithmetic logic unit (ALU) support for value-based control dependence sequences. The present invention enables a processor to process value-based control dependence sequences without the use of a branch prediction unit, as implemented in the prior art.

According to a first embodiment of the present invention, an ALU generates a carry-out signal designating one of a first and second value as a larger value. In response to the carry-out signal, the ALU updates a storage location with a third value, which is the larger value.

According to a second embodiment of the present invention, an ALU generates a carry-out signal designating one of a first and second value as a larger value. In response to the carry-out signal, the ALU updates a storage location with a third value. The third value is a fourth value, if the carry-out signal designates the first value as the larger value or the third value is a fifth value, if the carry-out signal designates the second value as the larger value.

While the present invention has been particularly shown and described with reference to a preferred embodiment, it will be understood by those skilled in the art that various changes in form and detail may be made therein without departing from the spirit and scope of the invention.

What is claimed is:

1. A fixed-point unit comprising:
    a control module circuit for providing a first control signal, a second control signal and a third control signal;
    an arithmetic logic unit (ALU) circuit for selectively performing a logical operation, an arithmetic operation or a value-based operation on a first and second operands based on various combinations of assertions and deassertions of said first and third control signals, wherein said first and second operands are received from a plurality of general purpose registers, wherein said ALU performs a logical operation when said first and third control signals are being asserted, wherein said ALU performs an arithmetic operation when said first and third control signals are being deasserted, wherein said ALU performs a value-based operation when said first control signal is being deasserted while said third control signals are being asserted; and
    a writeback module circuit for updating a storage location within said plurality of general purpose registers with one of said first and second operands in response to a carry-out signal from said ALU.

2. The fixed-point unit of claim 1, wherein
    said first control signal is a LGC_CNTL signal for specifying a particular operation to be performed on said first and second operands;
    said second control signal is a MAX signal for controlling propagation of said carry-out signal for designating one of said first and second operands as a larger value; and
    said third control signal is a Logical signal for activating a logic unit to perform a logic function on said first and second operands.

3. The fixed-point unit of claim 1, wherein said writeback module circuit updates said storage location with a larger one of said first and second operands in response to said carry-out signal from said ALU.

4. The fixed-point unit of claim 1, wherein said writeback module circuit updates said storage location with a smaller one of said first and second operands in response to said carry-out signal from said ALU.

5. The fixed-point unit of claim 1, wherein said writeback module circuit updates said storage location with said first operand in response to said carry-out signal designates said first operand being larger than said second operand.

6. The fixed-point unit of claim 5, wherein said writeback module circuit updates said storage location with said second operand in response to said carry-out signal designates said second operand being larger than said first operand.

7. The fixed-point unit of claim 1, wherein said writeback module circuit updates said storage location with said a first value in response to said carry-out signal designates said first operand being larger than said second operand.

8. The fixed-point unit of claim 7, wherein said writeback module circuit updates said storage location with said a second value in response to said carry-out signal designates said second operand being larger than said first operand.

* * * * *